| United States Patent [19] | [11] Patent Number: 4,578,588 |
| Galkin | [45] Date of Patent: Mar. 25, 1986 |

[54] VOLUME REDUCTION IN LIQUID SCINTILLATION COUNTING

[76] Inventor: Benjamin M. Galkin, 35 Ivy La., Cherry Hill, N.J. 08002

[21] Appl. No.: 522,943

[22] Filed: Aug. 12, 1983

[51] Int. Cl.$^4$ .................. G01N 21/11; G01N 21/03
[52] U.S. Cl. .................. 250/432 R; 250/328; 422/102
[58] Field of Search .................. 250/328, 438, 432 R; 206/305, 514, 814; 215/6, 10, 231; 356/246; 422/102

[56] References Cited

U.S. PATENT DOCUMENTS

| 2,587,221 | 2/1952 | Richardson et al. | 436/65 |
| 3,027,799 | 4/1962 | Weichselbaum | 356/246 |
| 3,464,798 | 9/1969 | Kilthau | 422/102 |
| 4,140,489 | 2/1979 | Lee | 435/39 |
| 4,427,634 | 1/1984 | Truglio | 422/99 |
| 4,495,151 | 1/1985 | Ohyama et al. | 422/102 |

OTHER PUBLICATIONS

Horace E. Dobbs, "Measurement of Liquid Scintillation Counting Efficiencies", *Nature*, vol. 200, No. 4913, (Dec. 28, 1963), pp. 1283–1284.

*Primary Examiner*—Alfred E. Smith
*Assistant Examiner*—Constantine Hannaher
*Attorney, Agent, or Firm*—Caesar, Rivise, Bernstein & Cohen

[57] ABSTRACT

A volume reducer for liquid scintillation counting is adapted to be used with an outer scintillation-counting vial and includes an elongate member adapted to be inserted into the vial. The elongate member has a bottom surface and a peripheral side surface and the side surface is spaced inwardly from an inner side surface of the vial to define an annular chamber in which the scintillation fluid is adapted to be retained. In certain embodiments the annular chamber is varied to either isolate certain segments thereof from each other or provide segments having differing volumes. The combination of the reducer and vial, as well as methods for preparing a scintillation fluid for testing also constitute parts of the instant invention.

21 Claims, 9 Drawing Figures

VOLUME REDUCTION IN LIQUID SCINTILLATION COUNTING

BACKGROUND OF THE INVENTION

This invention relates generally to the field of scintillation counting, and more specifically to unique devices for reducing the volume of liquid utilized in liquid scintillation counting, and to unique methods for carrying out the scintillation counting operation.

Liquid scintillation counting involves the use of a liquid scintillation fluid comprising a scintillator (e.g., a fluor) carried in a solvent therefor, and a dissolved or suspended radioactive sample to be measured. The radiation emitted as the radioactive atoms of the sample decay interacts with the scintillator to produce fluorescent radiation. This radiation then is measured by a photomultiplier tube and converted to electrical signals that constitute a measurement of the radioactivity of the sample.

The radioactivity of a particular sample commonly is measured as part of an experiment or test to determine other chemically-related information. For example, it is common to measure the radioactivity of a sample in testing to determine the amount of specific chemical in the urine of an animal being treated with a particular type of drug.

It is extremely desirable to use as little of the liquid scintillation fluid as possible in view of the fact that it is costly, volatile, toxic and flammable. Moreover, expensive special procedures may be required to dispose of the fluid in accordance with state and/or federal regulations.

It is quite common in present counting systems to utilize 20 milliliter counting vials which usually are filled approximately halfway with the liquid scintillation fluid. Devices are also available which facilitate the use of smaller amounts of fluid. For example, it is known to use either a rigid or flexible container having less than a 20 milliliter capacity (e.g., a 7 milliliter polyethylene vial) for receiving the fluid. This smaller container then is retained in a holder of approximately the same size as the conventional 20 milliliter counting vial for the purpose of carrying out the measuring operation. By the use of these smaller containers, or vials, the fluid volume used in measuring radioactivity can be reduced by a factor of about 2 to 3, as compared to the volume used in a conventional 20 milliliter vials. However, further reduction has been limited by the required vial geometry inherent in the counting system.

In present liquid scintillation counting systems the measured disintegration rate from the radioactive sample can sometimes be significantly different from the actual, or true, disintegration rate. This can result from a process known as "quenching", which actually reduces the transfer of light energy from the scintillator (e.g., fluor) to the output of the photomultiplier tube(s). Presently available techniques known to Applicant to correct for the effects of quenching all depend upon measuring the light emitted from the scintillation fluid resulting from the interaction of the fluor and either a sample radionuclide, an added radionuclide, or an external radioactive source. In other words, only a single modality has been used in these prior art techniques, that being the light resulting from the interaction of a radioactive sustance with the scintillator in the scintillation fluid.

OBJECTS OF THE INVENTION

It is a general object of this invention to reduce the volume of fluid scintillation fluid required for use in liquid scintillation counting.

It is a further object of this invention to reduce the volume of fluid scintillation fluid required for use in liquid scintillation counting while still being able to use conventionally-sized counting vials.

It is a further object of this invention to reduce the volume of scintillation fluid required in scintillation counting in a manner which is not severely limited by the required vial geometry inherent in the counting system.

It is a further object of this invention to be able to utilize more than one modality to assist in measuring the quenching effect of the liquid scintillation fluid.

It is a further object of this invention to eliminate the need for including the scintillator in the scintillation fluid.

It is still a further object of this invention to be able to employ different volumes of a scintillation fluid to assist in measuring the quenching effect of the liquid.

SUMMARY OF THE INVENTION

These and other objects of the invention are achieved with an inner volume reducer usable with an outer scintillation counting vial that is adapted to receive liquid scintillation fluid therein. The volume reducer is an elongate member adapted to be inserted into the outer vial, and includes peripheral side and bottom surfaces to force liquid toward the periphery of the outer vial. The elongate member is dimensioned so that at least a portion of the peripheral side surface is spaced inwardly from an inner surface of the outer vial to provide a peripheral annular chamber for receiving the liquid scintillation fluid. In certain embodiments the volume reducer is configured to divide the annular chamber into physically isolated segments, or segments having differing volumes.

Other objects and many of the attendant advantages of this invention will be readily appreciated as the same becomes better understood by reference to the following description when considered in connection with the accompanying drawings.

DESCRIPTION OF THE PREFERRED EMBODIMENTS

Figure 1:
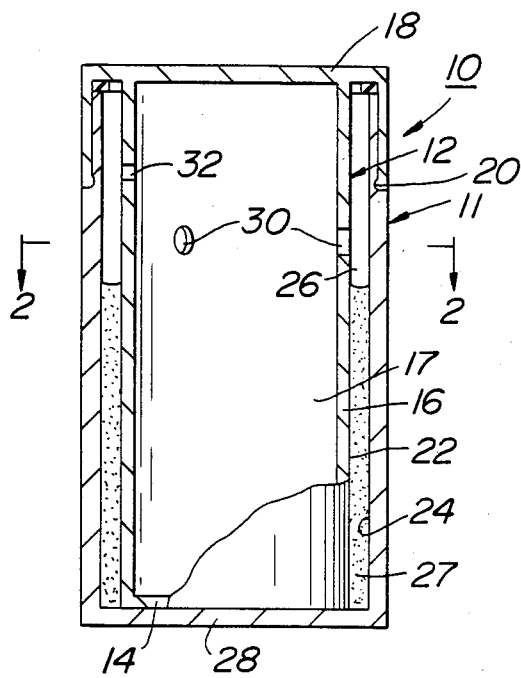
FIG. 1 is a front elevational view, partially in section, showing a scintillation vial employing a volume reducer therein in accordance with this invention.

Referring now in greater detail to the various figures of the drawing wherein like reference characters refer to like parts, a scintillation counting device embodying the present invention is generally shown at 10 in FIG. 1. The device 10 basically comprises an outer scintillation counting vial 11 and an inner volume reducer 12. The outer vial 11 can be of a conventional type that has been utilized in the past to retain liquid scintillation fluid therein.

Figure 2:
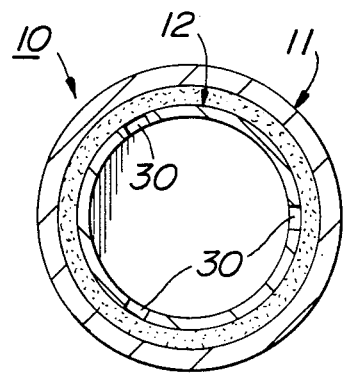
FIG. 2 is a sectional view taken along line 2—2 of FIG. 1.

Referring specifically to FIGS. 1 and 2, a unique volume reducer 12 employed in connection with vial 11 includes an elongate hollow cylindrical member having a bottom wall 14, a peripheral sidewall 16 and an interior compartment 17. In the illustrated embodiment the reducer 12 also includes an upper cap section 18 forming a unitary extension of the hollow cylindrical member 12. This cap section is adapted to be snapped into engagement with a circumferential groove 20 disposed in the outer wall of the vial 11.

The outer surface 22 of the sidewall 16 is spaced radially inward of the inner peripheral side surface 24 of the vial 11 to thereby form an annular chamber 26 for receiving or retaining liquid scintillation fluid 27 therein. Note that the bottom wall 14 of the volume reducer, in the illustrated embodiment, is in contact with bottom wall 28 of the vial 11 to thereby virtually exclude the presence of any scintillation fluid in the bottom area of the vial. This is desirable since scintillation fluid located in the bottom area is not effectively utilized in the scintillation counting operation, and therefore represents an unnecessary volume of liquid which, after the testing procedure is carried out, still needs to be handled as part of the disposal operation. Moreover, since the scintillation fluid is somewhat expensive, it is desirable to keep its quantity to a minimum.

Still referring to FIGS. 1 and 2, the volume reducer 12 includes a plurality of overflow passages 30 extending through the peripheral sidewall 16 thereof. In the illustrated embodiment three of such passages are shown; however, the number of such passages can be varied. The passages 30 function to receive the flow of scintillation fluid forced above them by the displacement of the fluid with the reducer 12. This assists in maintaining a desired maximum height of scintillation fluid in the peripheral chamber 26, and also in preventing the fluid from overflowing the vial 11. The reducer 12 also is provided with at least one air passage 32 therein to permit air to escape from the internal hollow compartment 17 in the event the fluid 27 is forced to enter the compartment 17 through the overflow passages 30.

It is within the scope of this invention to form the volume reducer 12 so that its bottom wall is spaced from the bottom wall of the vial to define a peripheral bottom chamber capable of receiving scintillation liquid. However, this is not particularly desirable for the reasons enumerated earlier.

It should be apparent from the above discussion that the reducer 12 will displace the liquid scintillation fluid initially placed in the vial and force the liquid to a desired height in the annular chamber 26. By making the outer diameter of the reducer 12 only slightly smaller than the inner diameter of the vial 11, very small amounts of scintillation liquid can be spread over a large surface, thereby overcoming the geometric limitations associated with existing counting systems.

The volume reducer 12 preferably is in the form of a rigid cylinder or other regularly faced polygon. Most preferably it is made of an inexpensive material, such as a plastic, (e.g., polyethylene) or glass, and is translucent, transparent or semi-reflective to facilitate coincidence counting. The reducer 12 either can be disposed of after use, or reused after being decontaminated.

Various alternate embodiments of the invention will now be described, wherein elements that are similar in structure and/or operation to corresponding elements in earlier-described embodiments will be referred to by the same numerals as employed in describing such earlier-described embodiments, but with the inclusion of a suffix thereafter.

Figure 3:
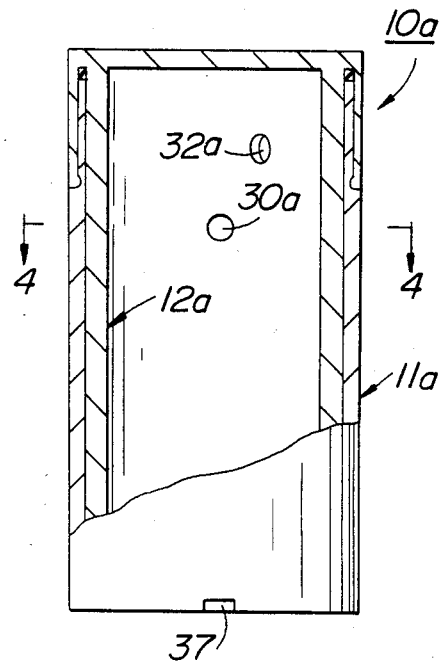
FIG. 3 is a longitudinal sectional view taken along line 3—3 of FIG. 4 illustrating a modified form of this invention.
Figure 4:
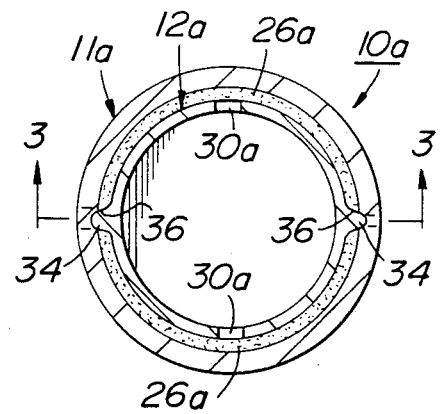
FIG. 4 is a sectional view taken along line 4—4 of FIG. 3.

Referring to FIGS. 3 and 4, a modified form of this invention is generally shown at 10a. Referring specifically to FIG. 4, the device 10a includes a volume reducer 12a having diametrically opposed projecting ribs 34 extending for the entire axial length thereof. These ribs 34 are adapted to fit tightly into diametrically opposed recesses 36 provided in the inner surface of a counting vial 11a by sliding the reducer into the vial.

This tight engagement between the ribs 34 and recesses 36 divides the peripheral liquid-receiving annular chamber into two separated arcuate segments 26a. By dividing the chamber in this manner the scintillation fluid in each segment can be analyzed by a different modality, such as light emitted from the scintillation fluid and light reflected from an external source, or electrical or magnetic signals from sources internal or external to the vial. The combination of signals generated by the different modalities can be utilized to detect changes in the degree of quenching (e.g., absorption of light or beta energy by the scintillation liquid) so that the necessary quantitative adjustment to the output signal can be made to compensate for the quenching effect.

In the illustrated embodiment the volume reducer 12a has an air passage 32a and an overflow passage 30a associated with each arcuate segment 26a of the peripheral chamber (only one air passage being illustrated in FIG. 3). These passages 32a, 30a perform exactly the same function as the air passage 32 and overflow passages 30 described earlier in connection with the device 10.

An important feature of the embodiment of the invention illustrated in FIGS. 3 and 4 resides in the provision of locating or aligning means on the outer vial 11a to permit the device 10a to be positioned with the arcuate segments 26a of the peripheral chamber properly aligned with the photomultiplier tube(s) of the scintillation counter. In the illustrated embodiment the vial 11a is provided with a recess 37 in the bottom surface thereof for cooperating with a raised projection on a platform or other member (not shown) that supports the device 10a in its proper orientation adjacent the photomultiplier tube(s). In view of the fact that the cylindrical volume reducer 12a is locked in a fixed position in the outer vial 11a through the cooperation of the projecting ribs 34 with the recesses 36, there is no need to provide additional keying means between said vial and reducer.

Figure 5:
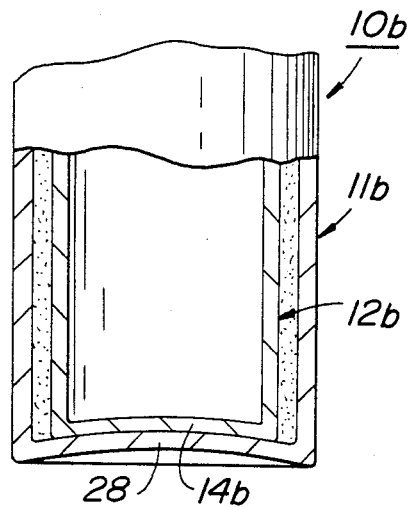
FIG. 5 is a fragmentary front elevational view, partially in section, illustrating a modified bottom construction usable in this invention.

Referring to FIG. 5, still another embodiment of this invention is illustrated at 10b. In this embodiment the outer vial 11b is provided with a generally concave bottom wall 28. To accommodate the volume reducer 12b to this configuration the bottom wall 14b of said reducer likewise is concave. This arrangement can be used in connection with all embodiments of this invention.

Figure 6:
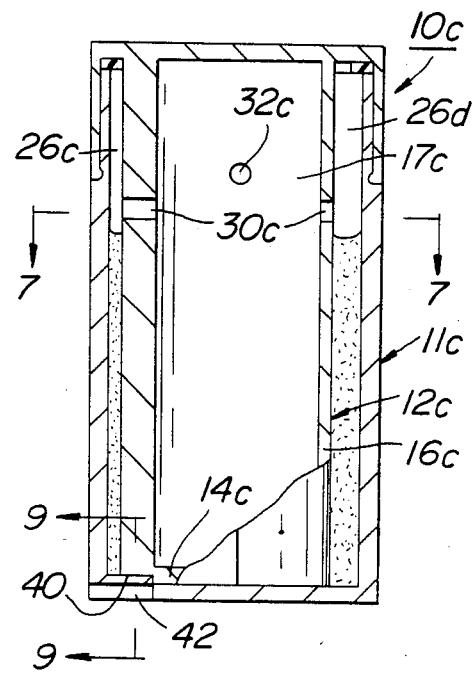
FIG. 6 is a front elevational view, partially in section, illustrating still a further embodiment of the invention.
Figure 8:
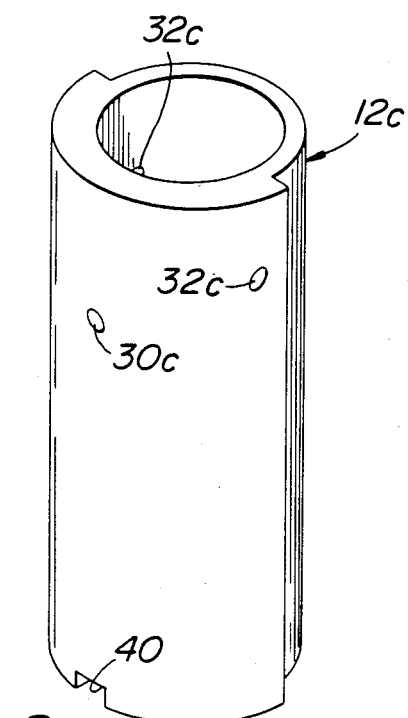
FIG. 8 is a perspective view illustrating the unique volume reducer employed in the vial illustrated in FIGS. 6 and 7; and, FIG. 9 is an enlarged sectional view taken along line 9—9 of FIG. 6.
Figure 7:
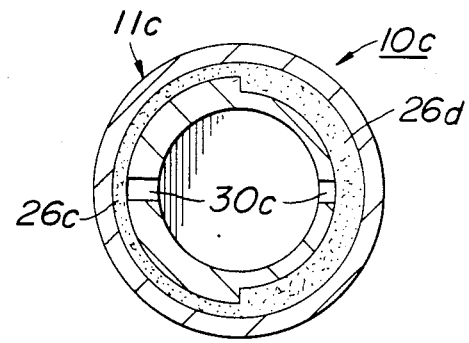
FIG. 7 is a sectional view taken along line 7—7 of FIG. 6.

Referring to FIGS. 6–8, still a further embodiment of the invention is illustrated at 10c. In the device 10c different segments 26c, 26d of the peripheral chamber between the vial 11c and the reducer 12c accommodate different volumes of liquid scintillation fluid. This is achieved by the use of a uniquely constructed volume reducer 12c that is similar in many respects to the volume reducer 12 illustrated in FIG. 1. In particular, the reducer 12c still has a hollow interior chamber 17c defined by inner surfaces of a bottom wall 14c and a substantially cylindrical sidewall 16c. Moreover, the volume reducer 12c also includes opposed overflow passages 30c and air escape passages 32c that provide the same function as the corresponding passages in the volume reducers 12 and 12a. Also, as is the case with the volume reducers described above, the volume reducer 12c is concentrically mounted within the vial 11c. That is, the central axis of the internal compartment 17c is coaxial with the central axis of the outer vial 11c.

The most significant difference between the volume reducer 12c and the earlier-described volume reducer 12 is that the peripheral sidewall 16c of the reducer 12c is of a varying thickness. In the illustrated embodiment, the sidewall 16c includes one hemispherical section of a constant, but greater thickness than the opposed hemispherical section. As can be seen best in FIGS. 6 and 7, when the volume reducer 12c is inserted within the outer vial 11c, the annular chamber for retaining the scintillation fluid 27c is divided into arcuate segments 26c and 26d having different volumes. Specifically, the arcuate segment 26c aligned with the thicker hemispherical segment of the sidewall 16c is adapted to retain a smaller volume of scintillation liquid therein than the opposed annular chamber segment 26d.

In the embodiment illustrated in FIGS. 6–8 the light emitted from the chamber segments 26c, 26d will travel through different path lengths of fluid to the photomultiplier tubes. The ratio of the measured disintegration rates from each segment can then be compared to known standards for the purpose of correcting for the quenching effect that the scintillation liquid may have on the emitted radiation. This eliminates the need for determining the necessary correction as a separate step by directing radiation into the fluid from an external radiation source.

In actual use of the device 10c, the measurement of the fluid in chamber segments 26c and 26d can be made in sequence as the vial 11c is rotated in front of the photomultiplier tube(s), of the analysis can be performed simultaneously on the liquid in each segment, depending upon the design of the particular detector system that is used.

Figure 9:
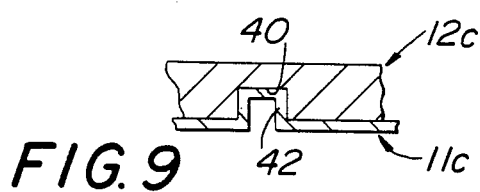

It is important that the volume reducer 12c be keyed against rotation within the interior of the outer vial 11c, and that the entire device 10c be positionable adjacent the photomultiplier tube(s) so that the chamber segments 26c and 26d can either be properly aligned with, or rotated in front of, said tube(s). Referring to FIGS. 6, 8 and 9, these objectives are achieved by providing a recess 40 in the bottom wall of the reducer 12c for receiving a raised, substantially inverted U-shaped projection 42 formed in the base of the outer vial 11c. This keys the reducer to the vial to prevent relative rotation between them, and thereby fixes the location of the opposed chamber segments 26c and 26d. The opening in the inverted U-shaped projection 42 then can be received on a projection associated with a platform (not shown) adapted to support the device 10c adjacent the photomultiplier tube(s) to thereby properly orient or locate the device 10c adjacent said tube(s).

Various modifications can be made within the scope of this invention. For example, in each of the illustrated embodiments, the snap-on cap section 12 can be modified to provide screw threads, in which case the cap will need to be rotated to tightly secure it to the outer vial. If a threaded cap is utilized in the embodiments illustrated in FIGS. 3 and 6 it is necessary to form the cap as a separate member from the elongate, cylindrical section of the reducer, since the cylindrical section in these latter embodiments are keyed to prevent rotation relative to the outer vial. Moreover, it should be understood that the cap member can, in all embodiments, be formed as a separate member from the remainder of the volume reducer 12. However, in the preferred form of this invention the cap is formed as a continuous extension of the volume reducer 12, and is adapted to be snapped into locking engagement with the outer vial. Also, in those embodiments requiring a specific orientation of the device with respect to the photomultiplier tube(s) of the scintillation counter, locating or aligning means, such as a recess, could be mounted on the cap or on regions of the vial other than at the bottom edge thereof.

Although the embodiments illustrated in FIGS. 3 and 6 have two arcuate chamber segments, the volume reducers and vials can be modified in accordance with this invention to provide additional segments, as desired. For example, in the embodiment illustrated in FIG. 3 the volume reducer 12a could be provided with additional ribs, equivalent to ribs 34, to firmly seat within additional recesses in the inner surface of the vial, equivalent to the recesses 36. Moreover, it is within the scope of this invention to provide either all or some of the projecting ribs 34 on the inner surface of the vial 11a, and likewise, to provide all or some of the corresponding recesses 36 in the outer periphery of the volume reducer 12a. In the embodiment illustrated in FIG. 6, the reducer 12c can be provided with a peripheral side wall having more than two different thicknesses to thereby define, with the inner surface of the outer vial, more than two chamber segments having different volumes relative to each other.

Unless specifically indicated otherwise, reference to "scintillation fluid" in the following claims includes a liquid in which radioactive material either is dissolved or dispersed, with or without a scintillator (e.g., primary and/or secondary fluor). Although in the most common embodiments of the invention the scintillation fluid includes both a fluor and the radioactive specimen, it is within the scope of this invention to actually coat the fluor on either the outer periphery of the volume reducer or the inner periphery of the outer vial to thereby interact with scintillation fluid containing only the radioactive sample and a liquid carrier therefor.

A representative scintillation fluid usable with this invention includes the radioactive sample dissolved or dispersed in the following liquid scintillator:

| | |
|---|---|
| PPO (2,5-diphenyloxazole) | 3 g |
| POPOP (2,2' paraphenylene bis 5-phenyloxazole) | 100 mg |

| | |
|---|---|
| -continued | |
| Toluene | 1000 ml |

The PPO is referred to as the "primary fluor" and is the substance which converts beta particle energy to light energy. POPOP is referred to as the "secondary fluor" and is employed to shift the wavelength of the light emitted from the primary fluor to a longer wavelength to which the photomultiplier tube(s) is (are) more sensitive. It should be understood that the particular scintillation fluid utilized with the devices of this invention actually do not form any part of the instant invention; the disclosure of a specific fluid being provided herein solely for the purpose of completeness.

Without further elaboration, the foregoing will so fully illustrate my invention that others may, by applying current or future knowledge, readily adapt the same for use under various conditions of service.

I claim:

1. A volume reducer usable with a scintillation vial, said vial having inner peripheral bottom and side surfaces defining an interior compartment adapted to receive scintillation fluid therein, characterized in that said reducer includes an elongate member having outer peripheral bottom and side surfaces adapted to displace scintillation fluid in the vial when inserted into the interior compartment of said vial, said outer peripheral side surface of the elongate member, when positioned in the vial, being spaced inwardly from the inner peripheral side surface of said vial to define an annular chamber for accommodating the scintillation fluid therein, whereby small amounts of scintillation fluid can be spread over a large surface in said annular chamber for use in a scintillation counting operation, said elongate member including keying means therein adapted to cooperate with keying means on said vial for locating the elongate member in a predetermined orientation relative to said vial.

2. The volume reducer of claim 1 characterized in that a scintillator is coated on the outer side surface.

3. The volume reducer of claim 1 characterized in that a cap adapted to seal an open upper end of the vial is formed as a unitary extension of the elongate member.

4. The volume reducer of claim 1 characterized in that said elongate member includes a bottom wall and a peripheral sidewall defining an interior chamber, said sidewall including at least one overflow passage through it for communicating the interior chamber of the elongate member with the annular chamber.

5. The volume reducer of claim 4 characterized by the inclusion of at least one air passage extending through the peripheral sidewall of the elongate member for permitting air to escape from the interior chamber when scintillation fluid moves into said interior chamber from the annular chamber.

6. The volume reducer of claim 1 characterized in that said keying means on the elongate member include elongate ribs and/or recesses adapted to cooperate, respectively, with recesses and/or ribs formed in the inner surface of the vial for dividing the annular chamber into separate segments.

7. A volume reducer usable with a scintillation vial, said vial having inner peripheral bottom and side surfaces defining an interior compartment adapted to receive scintillation fluid therein, characterized in that said reducer includes an elongate member having outer peripheral bottom and side surfaces adapted to displace scintillation fluid in the vial when inserted into the interior compartment of said vial, said outer peripheral side surface of the elongate member, when positioned in the vial, being spaced inwardly from the inner peripheral side surface of said vial to define an annular chamber for accommodating the scintillation fluid therein, whereby small amounts of scintillation fluid can be spread over a large surface in said annular chamber for use in a scintillation counting operation said elongate member including a bottom wall and peripheral sidewalls defining an interior chamber, said peripheral sidewalls having a varying thickness about the periphery thereof.

8. The volume reducer of claim 7 characterized in that said sidewall includes at least one overflow passage through it for communicating the interior chamber of the elongate member with the annular chamber.

9. The volume reducer of claim 8 characterized by the inclusion of at least one air passage extending through the peripheral sidewall of the elongate member for permitting air to escape from the interior chamber when scintillation fluid moves into said interior chamber from the annular chamber.

10. The combination of an outer vial having an interior compartment adapted to receive scintillation fluid therein for use in liquid scintillation counting, and an inner volume reducer, characterized in that the volume reducer includes an elongate member located within the interior compartment of the outer vial and having an outer peripheral bottom surface and an outer elongate peripheral side surface, said side surface being spaced inwardly from an inner peripheral side surface of the interior compartment of the outer vial to thereby define an annular chamber for retaining the scintillation fluid, and cooperating keying means associated with the volume reducer and vial for locating the reducer in a predetermined rotational position relative to said vial and for preventing relative rotational movement between said reducer and vial.

11. The combination of claim 10, characterized in that a scintillator is coated on the outer peripheral side surface of the volume reducer and/or the inner peripheral side surface of the interior compartment of the vial.

12. The combination of claim 10 characterized in that a cap adapted to close an upper open end of the outer vial is a unitary extension of the elongate member.

13. The combination of claim 10 characterized in that the elongate member includes a peripheral bottom wall and an elongate peripheral sidewall defining a hollow interior chamber, said peripheral sidewall including at least one overflow passage through it for communicating the annular chamber between the outer vial and elongate member with the interior chamber within said elongate member.

14. The combination of claim 13 characterized in that the peripheral sidewall of the elongate member includes at least one air passage extending through it for permitting air to escape from the interior chamber of the elongate member when scintillation fluid moves into said interior chamber through an overflow passage.

15. The combination of claim 10 characterized in that the cooperating keying means associated with the volume reducer and the vial include elongate extending ribs and cooperating recesses adapted to receive said ribs.

16. The combination of claim 10 characterized by additional keying means on the vial adapted to cooperate with complementary keying means on a member adapted to support the vial during the scintillation counting operation.

17. The combination of claim 16 characterized in that said additional keying means on the vial includes an inwardly directed recess in a wall of said vial adapted to receive a cooperating projection on the member adapted to support said vial.

18. The combination of an outer vial having an interior compartment adapted to receive scintillation fluid therein for use in liquid scintillation counting, and an inner volume reducer, characterized in that the volume reducer includes an elongate member located within the interior compartment of the outer vial and having an outer peripheral bottom surface and an outer elongate peripheral side surface, said side surface being spaced inwardly from an inner peripheral side surface of the interior compartment of the outer vial to thereby define an annular chamber for retaining the scintillation fluid, said spacing between the inner peripheral side surface of the vial and the outer peripheral side surface of the elongate member varying to define an annular chamber having segments with differing volumes.

19. The combination of claim 18 characterized in that the elongate member has a peripheral bottom wall and an elongate peripheral sidewall defining an interior chamber, the central axis of said chamber being coaxial with the central axis of the interior compartment of said vial, the thickness of said peripheral sidewall varying around the periphery of the elongate member to thereby define the segments of the annular chamber having differing volumes.

20. A method of preparing a scintillation fluid for a scintillation counting operation including the steps of:
    placing a small volume of scintillation fluid into an interior compartment of an outer vial, said interior compartment being defined by inner peripheral bottom and side surfaces,
    forcing the liquid upwardly adjacent the inner peripheral side surface of said outer vial by inserting an elongate member having peripheral bottom and sidewalls into the outer vial for defining an annular chamber between the sidewall of the elongate member and the inner side surface of the vial and retaining said scintillation fluid in the annular chamber, and
    dividing the annular chamber in which the scintillation fluid is retained into separated segments capable of being analyzed by different modalities.

21. A method of preparing a scintillation fluid for a scintillation counting operation including the steps of:
    placing a small volume of scintillation fluid into an interior compartment of an outer vial, said interior compartment being defined by inner peripheral bottom and side surfaces,
    forcing the liquid upwardly adjacent the inner peripheral side surface of said outer vial by inserting an elongate member having peripheral bottom and sidewalls into the outer vial for defining an annular chamber between the sidewall of the elongate member and the inner side surface of the vial, and
    dividing the annular chamber into segments having differing volumes, and retaining different volumes of scintillation fluid in said segments.

* * * * *